United States Patent
Wilhelmsson et al.

(10) Patent No.: US 9,596,070 B2
(45) Date of Patent: Mar. 14, 2017

(54) METHODS AND APPARATUSES FOR DEVICE-TO-DEVICE COMMUNICATION

(71) Applicant: Telefonaktiebolaget L M Ericsson (publ), Stockholm (SE)

(72) Inventors: Leif Wilhelmsson, Dalby (SE); Bengt Lindoff, Bjarred (SE); Anders Wallen, Ystad (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/432,509

(22) PCT Filed: Sep. 27, 2013

(86) PCT No.: PCT/EP2013/070237
§ 371 (c)(1),
(2) Date: Mar. 31, 2015

(87) PCT Pub. No.: WO2014/053416
PCT Pub. Date: Apr. 10, 2014

(65) Prior Publication Data
US 2015/0288508 A1  Oct. 8, 2015

Related U.S. Application Data

(60) Provisional application No. 61/711,906, filed on Oct. 10, 2012.

(30) Foreign Application Priority Data

Oct. 4, 2012 (EP) ..................................... 12187186

(51) Int. Cl.
*H04L 5/14* (2006.01)
*H04W 72/08* (2009.01)
(Continued)

(52) U.S. Cl.
CPC ........... *H04L 5/14* (2013.01); *H04W 72/0446* (2013.01); *H04W 72/0453* (2013.01);
(Continued)

(58) Field of Classification Search
None
See application file for complete search history.

(56) References Cited

U.S. PATENT DOCUMENTS 6,016,430 A * 1/2000 Shinomiya ............ H04W 56/00
370/337
7,308,266 B2 * 12/2007 Du ......................... H04W 76/023
370/278

(Continued)

FOREIGN PATENT DOCUMENTS

WO  2011/088619 A1  7/2011

OTHER PUBLICATIONS

PCT International Search Report, mailed Oct. 28, 2013, in connection with International Application No. PCT/EP2013/070237, all pages.

(Continued)

*Primary Examiner* — Bunjob Jaroenchonwanit
(74) *Attorney, Agent, or Firm* — Leffler Intellectual Property Law, PLLC

(57) ABSTRACT

A UE for a cellular communication network is disclosed. The UE is adapted to communicate in a duplex mode with a network node of the cellular communication network, transmitting data to the network node in a UL duplex resource, and receiving data from the network node in a DL duplex resource. The UE is further capable of direct D2D communication with another UE of the cellular communication network using the UL duplex resource. The UE comprises a transceiver adapted to, as part of a D2D control procedure, receive, from the network node, a grant to listen (Continued)

to a transmission in the UL duplex resource from the other UE to the network node. Furthermore, the transceiver is adapted to, as part of the D2D control procedure, in response to receiving said grant, listen to said transmission in the UL duplex resource from the other UE, and determine a quality metric of said transmission from the other UE as received by the transceiver of the UE. A corresponding network node and corresponding methods are also disclosed.

23 Claims, 3 Drawing Sheets

(51) Int. Cl.
    *H04W 76/02*     (2009.01)
    *H04W 52/24*     (2009.01)
    *H04W 84/04*     (2009.01)
    *H04W 72/04*     (2009.01)
    *H04W 4/00*     (2009.01)
    *H04W 52/38*     (2009.01)
    *H04W 88/02*     (2009.01)

(52) U.S. Cl.
    CPC ......... *H04W 72/08* (2013.01); *H04W 72/082* (2013.01); *H04W 76/021* (2013.01); *H04W 76/023* (2013.01); *H04W 4/005* (2013.01); *H04W 52/243* (2013.01); *H04W 52/383* (2013.01); *H04W 72/04* (2013.01); *H04W 84/042* (2013.01); *H04W 84/045* (2013.01); *H04W 88/02* (2013.01)

(56) References Cited

U.S. PATENT DOCUMENTS

| | | | | |
|---|---|---|---|---|
| 7,548,758 | B2* | 6/2009 | Periyalwar | H04W 52/383 370/324 |
| 8,804,670 | B1* | 8/2014 | Talley | H04W 76/00 370/331 |
| 2005/0239451 | A1* | 10/2005 | Periyalwar | H04W 52/383 455/425 |
| 2006/0245398 | A1* | 11/2006 | Li | H04B 7/2668 370/335 |
| 2008/0069062 | A1* | 3/2008 | Li | H04W 52/265 370/338 |
| 2008/0069063 | A1* | 3/2008 | Li | H04W 88/06 370/338 |
| 2009/0010186 | A1* | 1/2009 | Li | H04W 52/243 370/310 |
| 2009/0221325 | A1* | 9/2009 | Periyalwar | H04W 52/383 455/552.1 |
| 2010/0040217 | A1* | 2/2010 | Aberg | H04L 12/1822 379/202.01 |
| 2010/0169498 | A1* | 7/2010 | Palanki | H04W 16/14 709/228 |
| 2012/0093098 | A1* | 4/2012 | Charbit | H04W 72/04 370/329 |
| 2012/0185605 | A1* | 7/2012 | Patil | H04W 76/023 709/228 |
| 2013/0178221 | A1* | 7/2013 | Jung | H04L 9/0844 455/450 |
| 2013/0316762 | A1* | 11/2013 | Charbit | H04W 76/023 455/552.1 |

OTHER PUBLICATIONS

PCT Written Opinion, mailed Oct. 28, 2013, in connection with International Application No. PCT/EP2013/070237, all pages.
Doppler, K. et al. "Device-to-device communication as an underlay to LTE-advanced networks", IEEE Communications Magazine, IEEE Service Center, Piscataway, US, vol. 47, No. 12, Dec. 1, 2009, pp. 42-49, XP011285852, ISSN: 0163-6804.
Fodor, G. et al. "Design aspects of network assisted device-to-device communications" IEEE Communications Magazine, Mar. 2012, pp. 170-177.

* cited by examiner

METHODS AND APPARATUSES FOR DEVICE-TO-DEVICE COMMUNICATION

CROSS-REFERENCE TO RELATED APPLICATIONS

This application claims priority under 35 U.S.C. §119 to European Patent Application No. 12187186.7, filed Oct. 4, 2012, which is hereby incorporated herein by reference in its entirety. This application also claims the benefit of U.S. Provisional Application No. 61/711,906, filed Oct. 10, 2012, which is hereby incorporated herein by reference in its entirety.

TECHNICAL FIELD

The present invention relates to control procedures and apparatuses facilitating device-to-device communications in cellular communication networks.

BACKGROUND

Cellular communication systems are becoming increasingly more important. In such cellular communication systems, a user equipment (UE), such as a mobile phone or cellular computer modems, connects wirelessly to the network via base stations (BSs), that in turn are connected to a backhaul network for forwarding the communication from the user equipment.

An example of such a cellular communication system is the 3GPP (3rd Generation Partnership Project) Long Term Evolution (LTE) system, in the following referred to simply as "LTE". In LTE, multiple access is achieved using OFDMA (Orthogonal Frequency Division Multiple Access), in which different resource blocks (RBs) can be reserved for different UEs. An RB is built up by a number of sub carriers of an OFDM (Orthogonal Frequency Division Multiplexing) signal during a certain time interval. Duplex communication between a UE and a base station can be accomplished using frequency division duplex (FDD), wherein signals are sent from the UE to the BS in an up-link (UL) frequency band and signals are sent from the BS to the UE in a down-link (DL) frequency band (separate and disjoint from the UL frequency band). Alternatively, time division duplex (TDD) communication between a UE and a base station can be accomplished, wherein signals are sent from the UE to the BS in UL time slots and from the BS to the UE in DL time slots (separate and disjoint from the UL time slots).

In order to better utilize the resources of a cellular communication system, it has been suggested that UEs may engage in so called device-to-device (D2D) communication, wherein the UEs communicate data directly between them, i.e. without sending the data via the cellular communication network node. Such D2D communication may be possible when two UEs are in the proximity of each other. Some aspects of D2D communication are briefly discussed in G. Fodor et al, "Design aspects of network assisted device-to-device communications", IEEE Communications Magazine, pp 170-177, March 2012.

It is desirable to provide D2D communication capability for a cellular communication network at a relatively low overhead.

SUMMARY

An object of the present invention is to facilitate D2D communication in a cellular communication network.

According to a first aspect, there is provided a user equipment (UE) for a cellular communication network adapted to communicate in a duplex mode with a network node of the cellular communication network, transmitting data to the network node in an up-link (UL) duplex resource, and receiving data from the network node in a down-link (DL) duplex resource. The UE is further capable of direct device-to-device (D2D) communication with another UE of the cellular communication network using the UL duplex resource. The UE comprises a transceiver. The transceiver is adapted to, as part of a D2D control procedure, receive, from the network node, a grant to listen to a transmission in the UL duplex resource from the other UE to the network node. Furthermore, the transceiver is adapted to, as part of the D2D control procedure, in response to receiving said grant, listen to said transmission in the UL duplex resource from the other UE. Moreover, the transceiver is adapted to, as part of the D2D control procedure, determine a quality metric of said transmission from the other UE as received by the transceiver of the UE.

The duplex mode may be a frequency division duplex (FDD) mode, whereby the UL duplex resource is a UL frequency band, and the DL duplex resource is a DL frequency band.

The duplex mode may be a time division duplex (TDD) mode, whereby the UL duplex resource is a set of timeslots reserved for UL transmission to the network node, and the DL duplex resource is a set of time slots reserved for DL transmission from the network node.

Said transmission in the UL duplex resource from the other UE may include a unique identifier of the other UE.

The transceiver may further be adapted to report the quality metric to the network node.

The cellular communication network may e.g. be a 3GPP long-term evolution (LTE) communication network.

According to a second aspect, there is provided a network node for a cellular communication network adapted to communicate in a duplex mode with UEs of the cellular communication network, receiving data from the UEs in a UL duplex resource, and transmitting data to the UEs in a DL duplex resource. At least a first UE of the cellular communication network is capable of direct D2D communication with at least another second UE of the cellular communication network using the UL duplex resource. The network node comprises circuitry adapted to, as part of a D2D control procedure, send, to the first UE, a grant to listen to a transmission in the UL duplex resource from the second UE to the network node, thereby enabling the first UE to determine a quality metric of said transmission from the second UE as received by the first UE.

The duplex mode may be a frequency division duplex (FDD) mode, whereby the UL duplex resource is a UL frequency band, and the DL duplex resource is a DL frequency band.

The duplex mode may be a time division duplex (TDD) mode, whereby the UL duplex resource is a set of timeslots reserved for UL transmission to the network node, and the DL duplex resource is a set of time slots reserved for DL transmission from the network node.

Said transmission in the UL duplex resource from the second UE may include a unique identifier of the second UE.

The network node may be further adapted to receive a report of the quality metric from the first UE. The network node may comprise circuitry adapted to determine whether to initiate a direct D2D communication link between the first UE and the second UE in the UL duplex resource based on the quality metric.

The cellular communication network may be an LTE communication network.

According to a third aspect, there is provided a method for a UE for a cellular communication network adapted to communicate in a duplex mode with a network node of the cellular communication network, transmitting data to the network node in a UL duplex resource, and receiving data from the network node in a down-link DL duplex resource. The UE is further capable of direct D2D communication with another UE of the cellular communication network using the UL duplex resource. The method comprises, as part of a D2D control procedure, receiving, from the network node, a grant to listen to a transmission in the UL duplex resource from another UE to the network node. Furthermore, the method comprises, as part of the D2D control procedure, in response to receiving said grant, listening to said transmission in the UL duplex resource from the other UE. Moreover, the method comprises, as part of the D2D control procedure, determining a quality metric of said transmission from the other UE as received by a transceiver of the UE.

The duplex mode may be a frequency division duplex (FDD) mode, whereby the UL duplex resource is a UL frequency band, and the DL duplex resource is a DL frequency band.

The duplex mode may be a time division duplex (TDD) mode, whereby the UL duplex resource is a set of timeslots reserved for UL transmission to the network node, and the DL duplex resource is a set of time slots reserved for DL transmission from the network node.

Said transmission in the UL duplex resource from the other UE may include a unique identifier of the other UE.

The method may further comprise reporting the quality metric to the network node.

The cellular communication network may e.g. be an LTE communication network.

According to a fourth aspect, there is provided a method for a network node for a cellular communication network adapted to communicate in a duplex mode with UEs of the cellular communication network, receiving data from the UEs in a UL duplex resource, and transmitting data to the UEs in a DL duplex resource. At least a first UE of the cellular communication network is capable of direct D2D communication with at least another second UE of the cellular communication network using the UL duplex resource. The method comprises, as part of a D2D control procedure, sending, to a first UE, a grant to listen to a transmission in the UL duplex resource from the other second UE to the network node, thereby enabling the first UE to determine a quality metric of said transmission from the second UE as received by the first UE.

Said transmission in the UL duplex resource from the second UE may include a unique identifier of the second UE.

The method according may further comprise receiving a report of the quality metric from the first UE.

Furthermore, the method may comprise performing, based on the quality metric, a determination of whether to initiate a direct D2D communication link between the first UE and the second UE in the UL duplex resource.

The duplex mode may be a frequency division duplex (FDD) mode, whereby the UL duplex resource is a UL frequency band, and the DL duplex resource is a DL frequency band.

The duplex mode may be a time division duplex (TDD) mode, whereby the UL duplex resource is a set of timeslots reserved for UL transmission to the network node, and the DL duplex resource is a set of time slots reserved for DL transmission from the network node.

Said transmission in the UL duplex resource from the other UE may include a unique identifier of the other UE.

The cellular communication network may e.g. be an LTE communication network.

Further embodiments are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
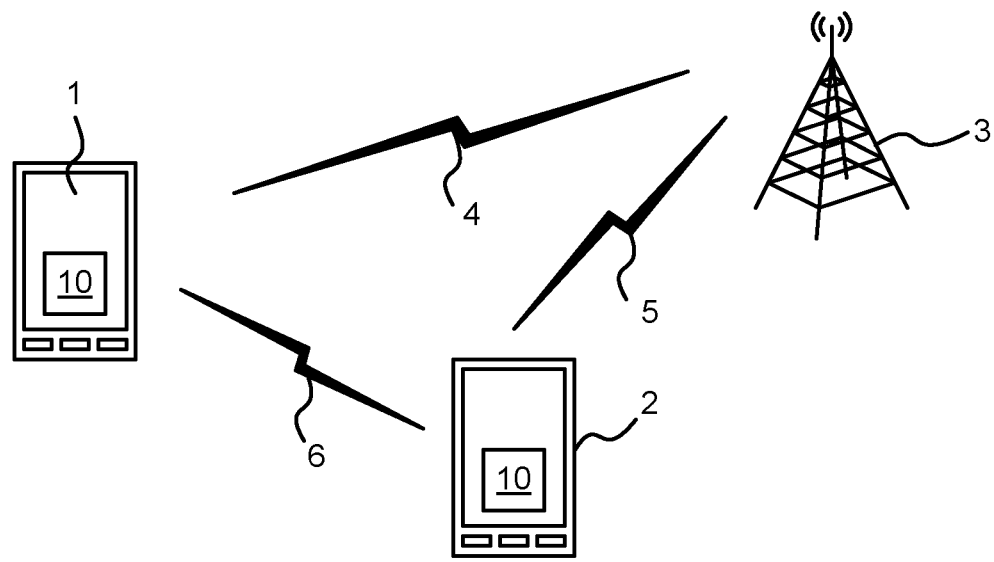
FIG. 1 schematically illustrates part of a cellular communication system.

FIG. 1 schematically illustrates an environment where embodiments of the present invention may be employed. A first UE 1 and a second UE 2 are in communication with a network node 3 of a cellular communication system via wireless communication links 4 and 5, respectively. In addition, the UEs 1 and 2 are capable of communicating directly with each other using a D2D link. An LTE communication system is considered as an example throughout this description, and in particular from the viewpoint of the first UE 1 (that is, reference is made in the text to the first UE 1, even though the same considerations might apply to other UEs, such as the second UE 2, as well). A network node in this context may e.g. be what is commonly referred to as a base station, an eNodeB, pico base station, macro base station, etc. Furthermore, a UE in this context may e.g. be a mobile phone, a cellular data modem, or a personal computer or other equipment comprising such a cellular data modem. However, it should be noted that embodiments of the present invention may be utilized in other types of cellular communication systems as well.

Either the UL frequency band or the DL frequency band may be used for D2D communication. However, there are some advantages of using the UL frequency band. For example, if the DL frequency band is used for D2D communication, this means that the UE 1 transmits also in the DL frequency band. The received signal power at the UE 1 from the network node 3 in the DL frequency band might be relatively low (e.g. depending on the distance between the UE 1 and the network node), and thus the signal transmitted by the UE 1 in the DL frequency band might act as a blocker for the signals received from the network node 3 at the first UE 1 (and also for signals received at other UEs from the network node 3). This problem is alleviated if the UL frequency band is used instead, which is assumed in this description. Although a blocking situation in principle can be present also in the UL frequency band, this will then happen at the network node, and since the network node is in control of the power allocation it has the possibility to easily solve the problem.

The terms "UL frequency band" and "DL frequency band" implies the use of frequency division duplex (FDD) in the cellular communication between the UEs 1, 2 and the network node. However, other duplex approaches, such as time-division duplex (TDD) may be considered as well. Thus, the more general terms "UL duplex resource" and "DL duplex resource" are used throughout this text. In the case of FDD, the UL duplex resource is the UL frequency band and the DL duplex resource is the DL frequency band. In the case of TDD, the UL duplex resource is a set of timeslots reserved for UL transmission to the network node 3, and the DL duplex resource is a set of time slots reserved for DL transmission from the network node 3.

Figure 2:
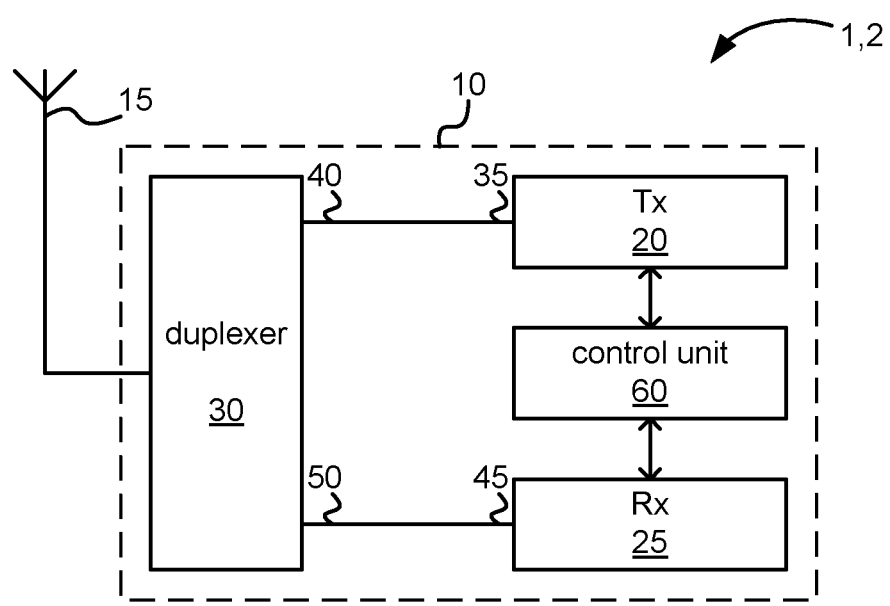
FIG. 2 is a simplified block diagram of an embodiment of a UE.

FIG. 2 is a simplified block diagram of the UE 1 according to an embodiment of the present invention. As indicated with the reference sign "1, 2" in FIG. 1, the UE 2 may be designed in the same way as UE 1. The UE 1 is adapted to communicate in a duplex mode with the network node 3 of the cellular communication network, transmitting data to the network node 3 in a UL duplex resource, and receiving data from the network node 3 in a DL duplex resource. The UE 1 is further capable of direct D2D communication with the UE 2 using the UL duplex resource. The UE 1 would typically be capable of communicating also with other network nodes than the network node 3, and would typically be capable of direct D2D communication with other UEs than the UE 2. However, the communication with the network node 3 and the UE 2 is used as an example herein.

Reference is made below to D2D control procedures. Such control procedures may include for instance initiating and/or maintaining a D2D communication link between UEs 1 and 2. In so called network controlled D2D communication, such D2D control procedures are mainly performed by the network. However, some parts, such as signal quality measurements and sending reports and requests to the network may be performed by UEs. Thus, the D2D control procedures may be distributed among nodes such as various network nodes and UEs.

Before a D2D link can be established between the UE1 and the UE2, it should preferably be determined that the link between the two devices is sufficiently good. It has previously been proposed that, in such a discovery phase, one of the UEs (in our example, UE 2) sends a beacon and the other UE (in our example, UE 1) is listening for this beacon. If received with sufficiently good quality (e.g. sufficiently good signal-to-interference ratio (SIR) or other quality metric), a D2D link might be established. The inventors have realized that such a procedure might waste radio resources that can be used for other purposes, and therefore adds unwanted overhead to D2D control procedures. The inventors have further realized that such unwanted overhead can be reduced or eliminated if the other UE (again, in our example, UE 1) instead listens to transmissions from UE 2 that are ongoing anyway. This might either replace the beacon completely or complement the beacon in the way that it is used prior to the actual beacon is used, such that it is known beforehand that the beacon is likely to be detected by UE 1 and not wasted.

For example, if the network wants to determine if a D2D connection between UE 1 and UE 2 is feasible, it might request UE 1 to listen to a transmission from UE 2 to the network node 3. That is, UE 1 should listen in a UL duplex resource which is normally used for transmission from UE 2 to the network node 3 anyway. The UE 1 might be requested to listen for a specific reference signal which then is unique for the transmission from UE 2. UE 1 then tries to detect the signal from UE 2 and can report the outcome to the network node 3. Based e.g. on the transmission power used by UE 2 and the received quality at UE 1, the network node 3 can then for example obtain an estimate of the expected link quality between the UE 2 and the UE 1, and might further, based on this estimate, initiate a D2D connection between UE 1 and UE2 (or decide not to initiate such a D2D connection).

The UE 1 would thus need to listen in a resource where it is normally transmitting. According to embodiments of the present invention, the concept of a listening grant is introduced to support this behavior in D2D control procedures. The inventors propose that such a listening grant be sent from the network node 3 to the UE 1 as needed. The listening grant may e.g. comprise information about what to listen for (e.g. what type of signal) and when. The listening grant may be sent as part of network control signaling from the network to the UE 1.

According to embodiments of the present invention, the UE 1 comprises a transceiver 10, as shown in FIG. 2. As indicated in FIG. 1, also the UE 2 may comprise such a transceiver 10.

The transceiver is adapted to communicate wirelessly with the network node 3 of the cellular communication network. The UE 1 may further comprise an antenna 15, operatively connected to the transceiver 10, for sending and receiving radio frequency (RF) signals. Although the antenna 15 is illustrated in FIG. 2 as a single antenna, multiple antennas may be used as well. The UE 1 may comprise other components than those illustrated in FIG. 2, such as but not limited to a display, one or more buttons, wired or wireless communication interfaces, etc. Such other components are, however, omitted in FIG. 2 for simplicity.

FIG. 2 also shows a simplified block diagram of what the transceiver 10 may comprise. Other transceiver topologies are, however, also possible. As shown in FIG. 2, the transceiver 10 may comprise a transmitter 20 and a receiver 25. The design of transmitters and receivers for UEs for cellular communication networks per se is known in the art of transceiver design and is therefore not further described herein. Furthermore, the transceiver 10 may further comprise a duplexer 30. The duplexer 30 isolates the transmitter 20 and the first receiver 25, and allows them to be connected to a same antenna (e.g. the antenna 15 in FIG. 2). The design of duplexers per se is known in the art of transceiver design and therefore not further described in this description. Alternatively, the transmitter 20 and receiver 25 may be operatively connected to separate transmit and receive antennas (not shown), respectively. The transceiver 10 may further comprise multiple transmitters and/or receivers. For example, the transceiver 10 may comprise a dedicated receiver for listening in the UL duplex resource and/or for receiving D2D signals from the UE 2 in the UL resource and a dedicated receiver for "normal" cellular communication from the network node 3. Such multiple receivers in the transceiver 10 may e.g. simplify simultaneous reception of cellular transmissions from the network node 3 (in the DL duplex resource) and transmissions from the UE 2 (in the UL duplex resource). Furthermore, separate transmitters for cellular transmissions (to the network node 3) and D2D transmissions (to the UE 2) may also be used in the transceiver 10. However, since, according to embodiments of the present invention, both cellular transmissions and D2D transmissions from the UE 1 use the same UL duplex resource, the same transmitter 20 may be used relatively readily for both types of transmissions. For simplicity of illustration, only the transmitter 20 and the receiver 25 are explicitly shown in FIG. 2.

As further illustrated in FIG. 2, the transceiver 10 may comprise a control unit 60. The control unit 60 may e.g. be a baseband processor or the like. The control unit 60 may be adapted to control the operation of the transceiver 20 and the receiver 25. Furthermore, the control unit 60 may perform signal processing tasks, such as modulation, demodulation, coding, and decoding.

According to embodiments of the present invention, the transceiver 10 (of the UE 1) is adapted to, as part of a D2D control procedure, receive, from the network node 3, a grant (in the following referred to as "the listening grant") to listen to a transmission in the UL duplex resource from the UE 2 to the network node 3. The listening grant may e.g. be received via the receiver 25. Furthermore, according to embodiments of the present invention, the transceiver 10 is adapted to, in response to receiving the listening grant, listen to said transmission in the UL duplex resource from the other UE 2 to the network node 3. The transceiver 10 may perform the listening via the receiver 25 or via a dedicated receiver as indicated above. Moreover, according to embodiments of the present invention, the transceiver 10 is adapted to determine a quality metric of said transmission from the UE 2 as received by the transceiver 10 of the UE 1. The determination of the quality metric may e.g. be performed by the control unit 60. The quality metric may e.g. comprise or be an SIR, a received signal strength indication (RSSI) value, or a signal-to-noise ratio (SNR).

As indicated above, the transmission in the UL duplex resource from the other UE 2 may include an identifier, such as a unique identifier, of the other UE 2. An example of an identifier would be the location of the reference signals, which although may not be unique for all UEs typically are different for UEs which might cause interference to one another. Another example, which may be applicable in some cases, is to use the MAC address of UE 2 as the unique identifier. Thereby, it can be ensured that the traffic that the UE 1 is listening to actually emanates from the UE 2.

According to some embodiments, the transceiver may further be adapted to, as part of the D2D control procedure, report the quality metric to the network node 3. This may e.g. be done via the transmitter 20 from the control unit 60. The network node 3, or other parts of the network, may then make further use of the quality metric in the D2D control procedure.

Figure 3:
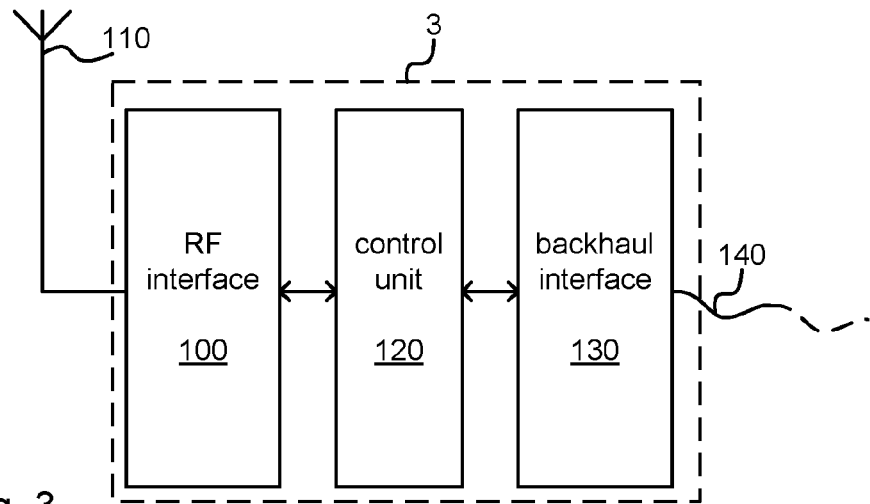
FIG. 3 is a simplified block diagram of an embodiment of a network node.

According to embodiments of the present invention, the network node 3 is adapted to communicate in a duplex mode with UEs (e.g. UEs 1 and 2) of the cellular communication network, receiving data from the UEs 1, 2 in said UL duplex resource, and transmitting data to the UEs 1, 2 in said DL duplex resource. A simplified block diagram of an embodiment of the network node 3 is illustrated in FIG. 3. According to the embodiment, the network node 3 comprises an RF interface 100 for wireless communication with UEs of the cellular communication network. For that purpose, the RF interface may comprise RF transmitters and receivers. In FIG. 3, the RF interface 100 is connected to an antenna 110 for facilitating the wireless communication with the UEs. The antenna 110 may be external to the network node 3, or may be comprised in the network node 3. Although a single antenna 110 is shown in FIG. 3, multiple antennas may be used as well.

According to the embodiment shown in FIG. 3, the network node 3 further comprises a control unit 120. The control unit 120 may e.g. comprise one or more processors. The control unit 120 may be adapted to perform signal processing tasks, such as modulation, demodulation, coding and decoding. Furthermore, the control unit 120 may be adapted to perform network control tasks, e.g. relating to scheduling, power control, handover, etc. Moreover, the control unit 120 may be adapted to perform processing tasks of D2D control procedures.

Furthermore, according to the embodiment illustrated in FIG. 3, the network node comprises a backhaul interface 130 for providing backhaul communication with other parts of the cellular communication network. The backhaul connection may e.g. comprise a wired link, e.g. electrical or optical, as indicated with a wire 140 in FIG. 3. Additionally or alternatively, the backhaul connection may comprise a wireless link (not shown).

According to embodiments of the present invention, the network node 3 comprises circuitry (such as the RF interface 100 and the control unit 120) adapted to, as part of a D2D control procedure, send, to the UE 1, a grant (i.e., the aforementioned listening grant) to listen to a transmission in the UL duplex resource from the UE 2 to the network node 3. Thereby, the UE 1 is enabled to determine a said quality metric of said transmission from the second UE 2 as received by the first UE 2.

The network node 3 may further be adapted to receive a report of the quality metric from the first UE 1. The network node 3, or other parts of the network, may then make further use of the quality metric in the D2D control procedure. For example, the network node 3 may comprise circuitry 120 adapted to determine whether to initiate a direct D2D communication link between the UE 1 and the UE 2 in the UL duplex resource based on the quality metric.

Figure 4:
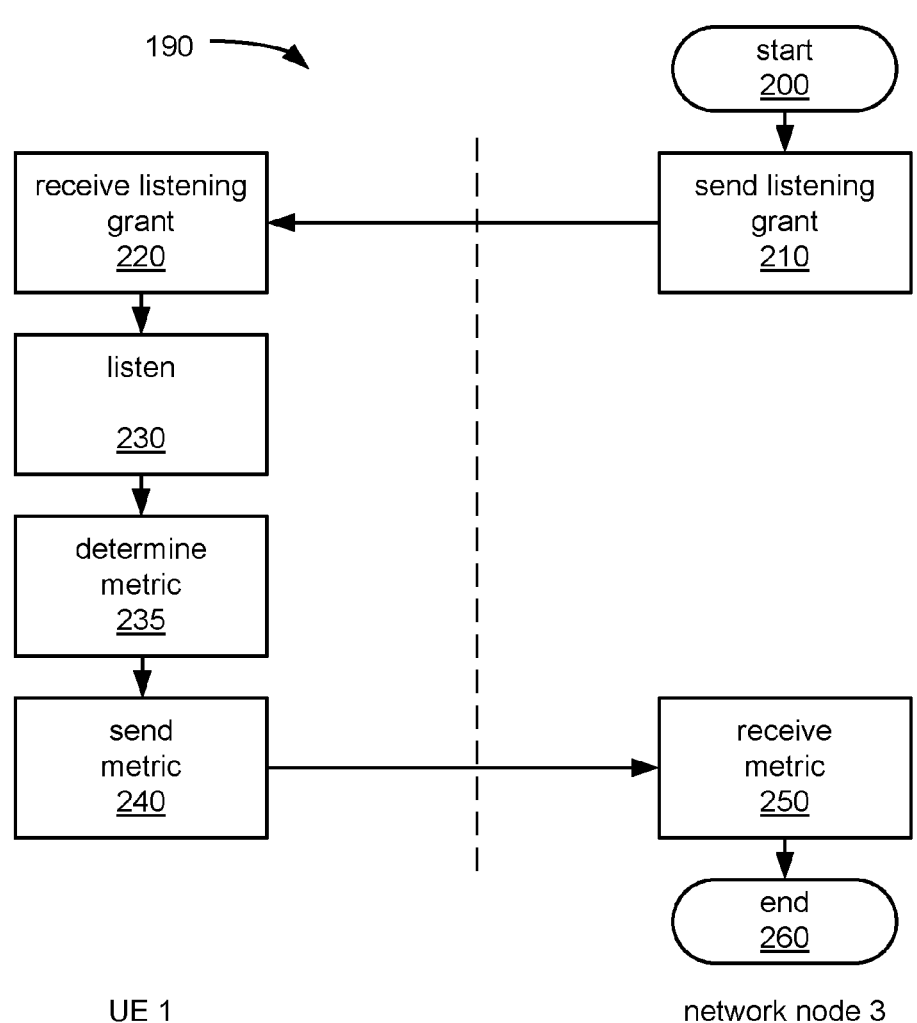
FIGS. 4-5 are flowcharts of methods according to embodiments of the present invention.

FIG. 4 is a flowchart of a sub procedure 190 of a D2D control procedure according to embodiments of the present invention. Steps performed by the UE 1 are indicated to the left, and steps performed by the network node 3 are indicated to the right. The sub procedure 190 is commenced in step 200. In step 210, the listening grant is sent from the network node 3 to the UE 1. In step 220, the listening grant is received by the UE 1. In step 230, the UE 1 listens to the transmission from the UE 2 to the network node 3. In step 235, the UE 1 determines the quality metric of said transmission from the UE 2 as received by the transceiver 10 of the UE 1. In step 240, a report of the quality metric is sent by the UE 1 to the network node 3. In step 250, the report of the quality metric is received by the network node 250. The sub procedure 190 is ended in step 260.

Figure 5:
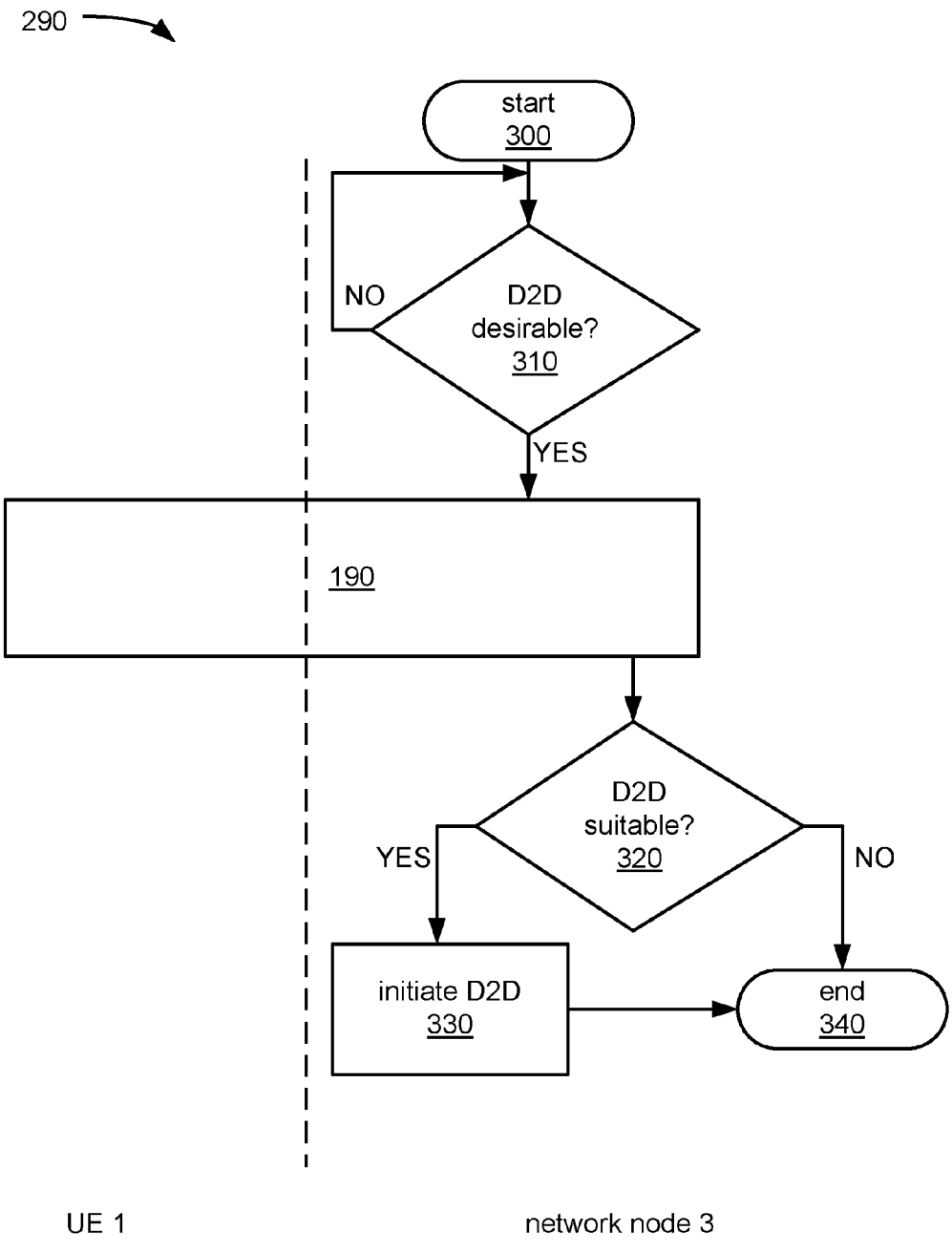

FIG. 5 is a flowchart of an example of a D2D control procedure 290 according to embodiments of the present invention. Again, steps performed by the UE 1 are indicated to the left, and steps performed by the network node 3 are indicated to the right. The illustrated D2D control procedure 290 has the purpose of, if desirable and possible, establishing a D2D communication link between the UE 1 and the UE 2. The D2D control procedure 290 is commenced in step 300. In step 310, it is checked by the network node if a D2D communication link between the UE 1 and the UE 2 is desirable. For example, such a D2D link may be desirable if the network node 3 would like to free up cellular communication resources. Alternatively, such a D2D link may be desirable if the UE 1 or the UE 2 has requested such a D2D link to be set up. If not, the D2D control procedure 290 returns to step 310 (or effectively stays in step 310 until a D2D link is desirable). If, on the other hand, it is determined in step 310 that a D2D communication link between the UEs 1 and 2 is desirable, the D2D control procedure 290 proceeds with the execution of the sub procedure 190 (FIG. 4), partly performed by the network node 3 and partly performed by the UE 1. When the sub procedure 190 has ended, the network node is provided with a report of the quality metric. In step 320, the network node then determines, based on the quality metric, whether a D2D communication link between the UE 1 and the UE 2 is suitable. For example, the network node may determine that such a D2D communication link is suitable if the quality metric exceeds a given threshold value, and unsuitable otherwise. However, the network node may take other parameters into consideration as well. As one example, because the signal transmitted from UE 2 might be transmitted at a much higher power level than is acceptable to be used for D2D communication, it could be that although the signal from UE 2 is received at a very high SNR (or other quality metric) it might still not suffice for a D2D link to be established since the transmitted power from UE2 then would have to be reduced to a level where the corresponding SNR (or other quality metric) at UE 1 would not suffice for the intended application. As another example, if the quality metric exceeds the threshold value, the network node 3 may order the UE 2 to transmit a dedicated D2D beacon (as mentioned above) for the UE 1 to listen to, and make the final decision of whether such a D2D communication link is suitable also based on measurement results from the UE 1 on the beacon transmitted by the UE 2. Alternatively or additionally, the network node 3 may order the UE 1 to transmit a dedicated D2D beacon for the UE 2 to listen to, and make the final decision of whether such a D2D communication link is suitable also based on measurement results from the UE 2 on the beacon transmitted by the UE 1. If it is decided in step 320 that such a D2D communication link between the UE1 and the UE 2 is suitable, the network node 3 initiates the D2D communication link, e.g. by transmitting control signals to one or both of the UEs 1 and 2 for setting up the D2D communication link. Such control signals may e.g. include scheduling information and/or power levels for the D2D communication link. Thereafter, the D2D control procedure 290 may be ended in step 340. After that, other D2D control procedures may take over, such as procedures for maintaining the D2D communication link between the UE 1 and the UE 2. If, on the other hand, it is determined in step 320 that a D2D communication link between the UE 1 and the UE 2 is not suitable, the D2D control procedure 290 may be ended in step 340 without initiating any such D2D communication link.

According to some embodiments of the present invention (e.g. with reference to FIGS. 4-5), there is provided a method for the UE 1. The method comprises, as part of a D2D control procedure (such as but not limited to the D2D control procedure 290 in FIG. 5), receiving (such as in the step 220, FIG. 4), from the network node 3, a grant (i.e. the aforementioned listening grant) to listen to a transmission in the UL duplex resource from the UE 2 to the network node 3. The method further comprises, as part of the D2D control procedure, in response to receiving the listening grant, listening (such as in the step 230, FIG. 4) to said transmission in the UL duplex resource from the UE 2 to the network node 3. Moreover, the method comprises, as part of the D2D control procedure, determining (such as in the step 235, FIG. 4) 230 the quality metric of said transmission from the UE 2 as received by the transceiver 10 of the UE 1.

The method may further comprise reporting (such as in the step 240, FIG. 4) the quality metric to the network node (3).

Furthermore, according to some embodiments of the present invention (e.g. with reference to FIGS. 4-5), there is provided a method for the network node 3. The method comprises, as part of a D2D control procedure (such as but not limited to the D2D control procedure 290 in FIG. 5), sending (such as in step 210, FIG. 4), to the UE 1, a grant (i.e. the aforementioned listening grant) to listen to a transmission in the UL duplex resource from the UE 2 to the network node 3. Thereby, the UE 1 is enabled to determine a quality metric of said transmission from the UE 2 as received by the UE 1.

The method may further comprise, as part of the D2D control procedure, receiving (such as in step 250, FIG. 4) a report of the quality metric from the UE 1.

Moreover, the method may comprise, as part of the D2D control procedure, performing (such as in step 320, FIG. 5), based on the quality metric, a determination of whether to initiate a direct D2D communication link between the UE 1 and the second UE 2 in the UL duplex resource.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A user equipment (UE) for a cellular communication network configured to communicate in a duplex mode with a network node of the cellular communication network, transmitting data to the network node in an up-link (UL) duplex resource, and receiving data from the network node in a down-link (DL) duplex resource; wherein the UE is further capable of direct device-to-device (D2D) communication with an other UE of the cellular communication network using the UL duplex resource; and the UE comprises a transceiver configured to, as part of a D2D control procedure:

receive, from the network node, a grant to listen to a transmission in the UL duplex resource from the other UE to the network node;

in response to receiving said grant, listen to said transmission in the UL duplex resource from the other UE; and determine a quality metric of said transmission from the other UE as received by the transceiver of the UE.

2. The UE according to claim 1, wherein the duplex mode is a frequency division duplex (FDD) mode, the UL duplex resource is a UL frequency band, and the DL duplex resource is a DL frequency band.

3. The UE according to claim 1, wherein the duplex mode is a time division duplex (TDD) mode, the UL duplex resource is a set of timeslots reserved for UL transmission to the network node , and the DL duplex resource is a set of time slots reserved for DL transmission from the network node.

4. The UE according to claim 1, wherein said transmission in the UL duplex resource from the other UE includes a unique identifier of the other UE.

5. The UE according to claim 1, wherein the transceiver is further configured to report the quality metric to the network node.

6. The UE according to claim 1, wherein the cellular communication network is a 3GPP long-term evolution (LTE) communication network.

7. A network node for a cellular communication network configured to communicate in a duplex mode with UEs of the cellular communication network, receive data from the UEs in an uplink (UL) duplex resource, and transmit data to the UEs in a downlink (DL) duplex resource, wherein at least a first UE of the cellular communication network is capable of direct device-to-device (D2D) communication with at least a second UE of the cellular communication network using the UL duplex resource; and wherein the network node comprises circuitry configured to, as part of a D2D control procedure:

send, to the first UE, a grant to listen to a transmission in the UL duplex resource from the second UE to the network node, thereby enabling the first UE to determine a quality metric of said transmission from the second UE as received by the first UE.

8. The network node according to claim 7, wherein the duplex mode is a frequency division duplex (FDD) mode, the UL duplex resource is a UL frequency band, and the DL duplex resource is a DL frequency band.

9. The network node according to claim 7, wherein the duplex mode is a time division duplex (TDD) mode, the UL duplex resource is a set of timeslots reserved for UL transmission to the network node , and the DL duplex resource is a set of time slots reserved for DL transmission from the network node.

10. The network node according to claim 7, wherein said transmission in the UL duplex resource from the second UE includes a unique identifier of the second UE.

11. The network node according to claim 7, wherein the network node is further configured to receive a report of the quality metric from the first UE.

12. The network node according to claim 11, comprising circuitry configured to determine whether to initiate a direct D2D communication link between the first UE and the second UE in the UL duplex resource based on the quality metric.

13. The network node according to claim 7, wherein the cellular communication network is an LTE communication network.

14. A method for a UE for a cellular communication network configured to communicate in a duplex mode with a network node of the cellular communication network, transmit data to the network node in an up-link (UL) duplex resource, and receive data from the network node in a down-link (DL) duplex resource, wherein the UE is further capable of direct device-to-device (D2D) communication with an other UE of the cellular communication network using the UL duplex resource; and wherein the method comprises, as part of a D2D control procedure:

receiving, from the network node, a grant to listen to a transmission in the UL duplex resource from the other UE to the network node;

in response to receiving said grant, listening to said transmission in the UL duplex resource from the other UE; and determining a quality metric of said transmission from the other UE as received by a transceiver of the UE.

15. The method according to claim 14, wherein said transmission in the UL duplex resource from the other UE includes a unique identifier of the other UE.

16. The method according to claim 14, further comprising:

reporting the quality metric to the network node.

17. A method for a network node for a cellular communication network configured to communicate in a duplex mode with user equipments (UEs) of the cellular communication network, receive data from the UEs in an up-link (UL) duplex resource, and transmit data to the UEs in a down-link (DL) duplex resource, wherein at least a first UE of the cellular communication network is capable of direct D2D communication with at least a second UE of the cellular communication network using the UL duplex resource; and the method comprising, as part of a D2D control procedure:

sending, to the first UE, a grant to listen to a transmission in the UL duplex resource from the second UE to the network node, thereby enabling the first UE to determine a quality metric of said transmission from the second UE as received by the first UE.

18. The method according to claim 17, wherein said transmission in the UL duplex resource from the second UE includes a unique identifier of the second UE.

19. The method according to claim 17, further comprising:

receiving a report of the quality metric from the first UE.

20. The method according to claim 19, comprising:

performing, based on the quality metric, a determination of whether to initiate a direct D2D communication link between the first UE and the second UE in the UL duplex resource.

21. The method according to claim 14, wherein the duplex mode is a frequency division duplex (FDD) mode, the UL duplex resource is a UL frequency band, and the DL duplex resource is a DL frequency band.

22. The method according to claim 14, wherein the duplex mode is a time division duplex (TDD) mode, the UL duplex resource is a set of timeslots reserved for UL transmission to the network node, and the DL duplex resource is a set of time slots reserved for DL transmission from the network node.

23. The method according to claim 14, wherein the cellular communication network is an LTE communication network.

* * * * *